July 29, 1924.
C. H. KAUP
VALVE FOR IRRIGATING APPARATUS
Filed Dec. 3, 1921
1,503,189
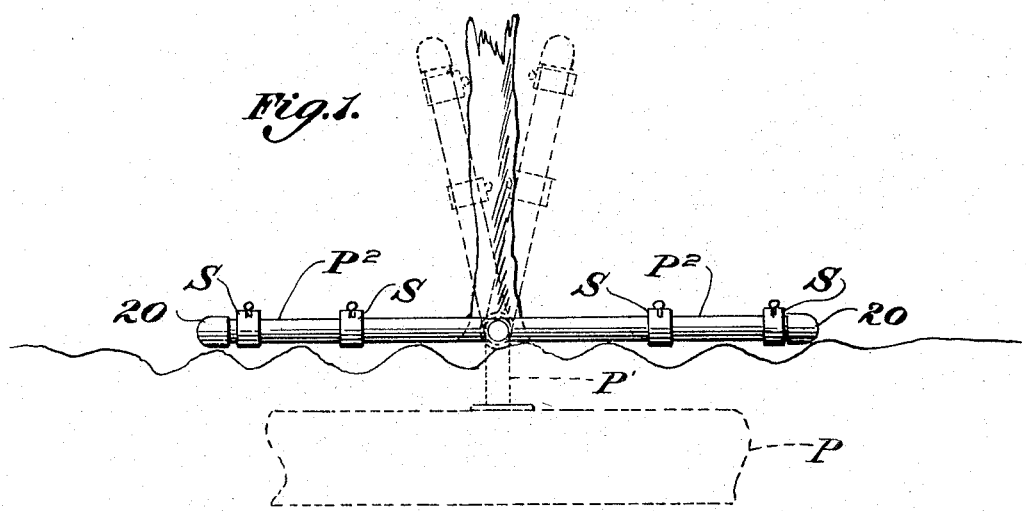
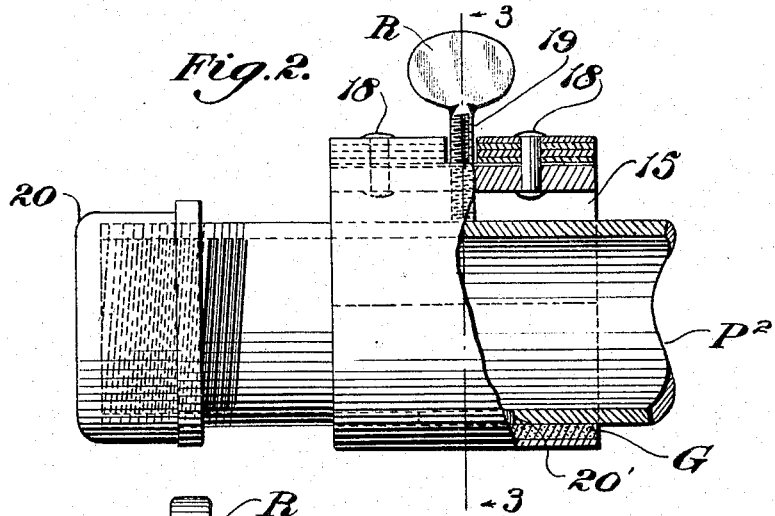
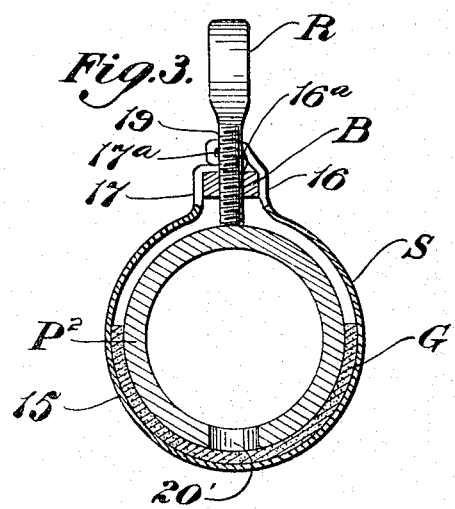
Inventor:
C. H. Kaup.
by Hazard & Miller
Attys.

Patented July 29, 1924.

1,503,189

UNITED STATES PATENT OFFICE.

CHARLES H. KAUP, OF WHITTIER, CALIFORNIA.

VALVE FOR IRRIGATING APPARATUS.

Application filed December 3, 1921. Serial No. 519,720.

*To all whom it may concern:*

Be it known that I, CHARLES H. KAUP, a citizen of the United States, residing at Whittier, in the county of Los Angeles and State of California, have invented new and useful Improvements in Valves for Irrigating Apparatus, of which the following is a specification.

My invention relates to valves for irrigating apparatus, and a purpose of my invention is the provision of a valve of extremely simple, durable and efficient construction which is readily adjustable to control the discharge of water from irrigating pipes.

I will describe one form of irrigating valve embodying my invention and will then point out the novel features thereof in claims.

In the accompanying drawings,

Figure 1 is a view showing a portion of an irrigating apparatus having incorporated therein one form of irrigating valve embodying my invention.

Fig. 2 is a fragmentary sectional view of the valve in applied position upon a distributing pipe.

Fig. 3 is a vertical sectional view taken on the line 3—3 of Fig. 2.

Referring specifically to the drawings in which similar reference characters refer to similar parts, my invention, in its present embodiment, comprises a split sleeve designated generally at S which is constructed of metal bent to provide a cylindrical body portion 15 and radial extensions 16 and 17 which have their terminals 16$^a$ and 17$^a$ folded upon themselves and upon each other to effect an interlocking of the portions in the manner clearly shown in Fig. 3. These terminal portions are riveted in folded position by rivets 18 or other suitable fastening members and to a bar B arranged between the portions 16 and 17 as clearly shown in Fig. 2. As shown in Fig. 2, the portions 16$^a$ and 17$^a$ are formed with registering openings adapted to receive the threaded shank 19 of a set screw R, the shank being threadedly fitted in the bar B with its inner end arranged between the portions 16 and 17 and extending into the body 15.

The sleeve S includes a gasket G made of rubber or other suitable material which, in the present instance, is of semicircular form so as to properly span the port which the valve is adapted to control when the latter is in closed position and to thereby form a water tight seal for the valve.

Referring now to Fig. 1, I have here shown one form of irrigating apparatus in which the valve just described is embodied. In this apparatus a main water pipe P is shown embedded in the ground and from which extends a branch pipe P' to a point at the surface of the ground. Distributing pipes P$^2$ are pivotally connected to the branch pipe P' to occupy an active position in which they repose upon the ground and an inactive position in which they are disposed vertically. The pipe P' is arranged in close proximity to the trunk of a fruit tree, while the distributing pipes P$^2$ when in active position are arranged to extend radially from the tree.

As shown in Fig. 2, the outer end of each pipe is closed by a cap 20 which is threadedly fitted thereon as is clearly shown. Each pipe P$^2$ is formed on its under side with two or more ports 20' through which the water is adapted to be distributed from the pipe. The valves forming the subject matter of my invention are associated with the pipes P$^2$ to control these ports 20', and to this end the sleeve S of each valve is slidably fitted upon the pipe so as to cover or uncover the port and to thereby control the passage of water from the pipe. It will be understood that when the set screw is adjusted to disengage the pipe P$^2$, the sleeve will be free to slide upon the pipe in effecting a covering or uncovering of the port 20. By adjusting the screw so as to cause it to firmly engage the pipe P$^2$, the sleeve can be locked against movement upon the pipe and to thereby draw the sleeve and consequently the gasket G into tight engagement with the pipe to hermetically seal the port 20', and to thereby positively prevent the leakage of water from the port.

Although I have herein shown and described only one form of irrigating valve embodying my invention, it is to be understood that various changes and modifications may be made herein without departing from the spirit of the invention and the spirit and scope of the appended claims.

I claim as my invention:

1. An irrigating valve comprising a split sleeve having radial extensions folded to effect an interlocking thereof, a bar interposed between the extensions and secured thereto, and a set screw threadedly fitted in the bar and extending into the sleeve for the purpose described.

2. An irrigating valve comprising a split sleeve whose ends are interlockingly folded above and secured to a bar and which is adapted to slide on a pipe to control a port therein, a gasket carried by the sleeve and movable therewith, and a set screw extending through said bar and adapted for securing the sleeve against movement on the pipe and forcing the gasket into tight engagement with the pipe to effect a non-leakable closing of said port.

In testimony whereof I have signed my name to this specification.

CHARLES H. KAUP.